United States Patent
Brown et al.

(10) Patent No.: US 9,940,328 B2
(45) Date of Patent: Apr. 10, 2018

(54) DYNAMIC THRESHOLD GATES FOR INDEXING QUEUES

(71) Applicant: MICROSOFT TECHNOLOGY LICENSING, LLC, Redmond, WA (US)

(72) Inventors: Kevin Lane Brown, Redmond, WA (US); Anatoly Grabar, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 461 days.

(21) Appl. No.: 14/635,093

(22) Filed: Mar. 2, 2015

(65) Prior Publication Data

US 2016/0259785 A1 Sep. 8, 2016

(51) Int. Cl.
| G06F 7/00 | (2006.01) |
| G06F 17/00 | (2006.01) |
| G06F 17/30 | (2006.01) |
| H04L 29/08 | (2006.01) |

(52) U.S. Cl.
CPC .... G06F 17/3007 (2013.01); G06F 17/30312 (2013.01); G06F 17/30321 (2013.01); G06F 17/30336 (2013.01); G06F 17/30619 (2013.01); G06F 17/30622 (2013.01); G06F 17/30637 (2013.01); G06F 17/30946 (2013.01); H04L 67/1023 (2013.01); H04L 67/1097 (2013.01)

(58) Field of Classification Search
None
See application file for complete search history.

(56) References Cited

U.S. PATENT DOCUMENTS

| 8,489,565 B2* | 7/2013 | Balasubramanian | G06F 17/30306 707/696 |
| 2003/0005024 A1* | 1/2003 | Grumann | G06F 11/3447 718/102 |
| 2006/0041606 A1* | 2/2006 | Sawdon | G06F 17/30613 |
| 2007/0143460 A1 | 6/2007 | Ben-David et al. | |
| 2009/0077198 A1 | 3/2009 | Larsson et al. | |
| 2009/0164437 A1 | 6/2009 | Torbjornsen | |
| 2010/0205382 A1* | 8/2010 | Giacobbe | H04L 47/29 711/147 |
| 2011/0125726 A1* | 5/2011 | Negoici-Negoescu | G06F 17/30864 707/709 |
| 2011/0142064 A1* | 6/2011 | Dubal | H04L 47/122 370/412 |

(Continued)

OTHER PUBLICATIONS

Second Written Opinion issued in PCT Application No. PCT/US2016/020304, dated Feb. 10, 2017.

(Continued)

*Primary Examiner* — David T Brooks
(74) *Attorney, Agent, or Firm* — Workman Nydegger (57) ABSTRACT

Electronic files are selectively assigned to a plurality of different indexing queues by one or more dynamic throughput threshold gates based on characteristics of the different indexing queues as well as the static file characteristics associated with each of the files. The files are then indexed. Upon detecting a change in a dynamic characteristic of one or more indexed files, the throughput threshold gate(s) are then modified to obtain, maintain or modify a desired throughput for one or more of the indexing queues.

19 Claims, 6 Drawing Sheets

(56) References Cited

U.S. PATENT DOCUMENTS

| | | | | |
|---|---|---|---|---|
| 2011/0153589 | A1* | 6/2011 | Vaitheeswaran | G06F 17/30705 707/709 |
| 2011/0191347 | A1* | 8/2011 | Maddali | G06F 17/30 707/741 |
| 2011/0295844 | A1* | 12/2011 | Sun | G06F 17/30864 707/723 |
| 2015/0055468 | A1* | 2/2015 | Agarwal | H04L 49/9047 370/232 |

OTHER PUBLICATIONS

Melink, et al., "Building a distributed full-text index for the web", ACM Transactions on Information Systems, vol. 19, No. 3, Jul. 2001, 25 pages.

Yuan-Chieh, et al., "Models for Dynamic Load Balancing in a Heterogeneous Multiple Processor System", IEEE Transactions on Computers, vol. C-28, No. 5, May 1979, 8 pages.

He, et al., "Allocating non-real-time and soft-real-time jobs in multiclusters", IEEE Transactions on Parallel and Distributed Systems, vol. 17, No. 2, Feb. 2006, 14 pages.

"International Search Report and Written Opinion Issued in PCT Application No. PCT/US2016/020304", dated Jun. 6, 2016, 14 pages.

Risvik, et al., "Search Engines and Web Dynamics", In Proceedings of Computer Networks, vol. 39, Issue 3, Jun. 21, 2002, 17 Pages.

Choudhari, et al., "Increasing Search Engine Efficiency using Cooperative Web", In Proceedings of International Conference on Computer Science and Software Engineering, vol. 4, Dec. 12, 2008, pp. 1040-1044.

Shin, et al., "Joint Optimization of Index Freshness and Coverage in Real-Time Search Engines", In Proceedings of IEEE Transactions on Knowledge and Data Engineering, vol. 24, No. 12, Jun. 30, 2011, pp. 2203-2217.

Jiang, et al., "Poisson Distribution-based Page Updating Prediction Strategy", In Proceedings of International Conference on Computer Science and Network Technology, vol. 2, Dec. 24, 2011, pp. 953-956.

Gadipudi, et al., "Maintaining Freshness of Search Engine Result Cache", Retrieved on: Nov. 28, 2014, Available at: http://www.google.co.in/url?sa=t&rct=j&q=&esrc=s&frm=1&source=web &cd=10&cad=rja&uact=8&ved=0CFYQFjAJ &url=http%3A%2F%2Fwww.researchgate.net%2Fprofile%2FHari_babu_Gadipudi%2Fpublication%.

Chen, et al., "TI: An Efficient Indexing Mechanism for Real-Time Search on Tweet", In Proceedings of SIGMOD Conference, Jun. 12, 2011, 12 pages.

Kausar, et al., "Maintaining the Repository of Search Engine Freshness using Mobile Crawler", In Proceedings of International Conference on Microelectronics, Communications and Renewable Energy, Jun. 4, 2013, 6 pages.

"Web Crawling and Indexes", Published on: Jun. 14, 2014, Available at: http://nlp.stanford.edu/IR-book/pdf/20crawl.pdf.

"International Preliminary Report on Patentability Issued in PCT Application No. PCT/US2016/020304", dated May 26, 2017, 10 Pages.

* cited by examiner

DYNAMIC THRESHOLD GATES FOR INDEXING QUEUES

CROSS-REFERENCE TO RELATED APPLICATIONS

N/A

BACKGROUND

Computer indexes are used to track and reference data which can be stored as electronic files in a variety of different formats and locations throughout the world.

When an index is created, it is necessary to scan each of the files being indexed to determine the content of the data files and to identify where and how that data is stored. As indexed documents are modified, it is also sometimes necessary to rescan and re-index those files.

The 'freshness' of an indexed file refers to how recently that file was scanned and indexed. The overall freshness of an index can sometimes be measured by the collective freshness of all the files that are referenced by the index. The efficacy of an index can likewise be measured by its overall index freshness.

The efficacy of an index can also be measured in terms of relevance as well as inclusiveness or completeness. The measure of relevance generally relates to whether the most relevant content is indexed. Often, the most relevant content is contained within the most recently created and/or stored files. Inclusiveness or completeness, on the other hand, generally relates to the magnitude or percentage of content and files that have been scanned and indexed out of a total scope of content that is available for indexing.

Due to the variety in format, size, accessibility and uniformity of electronic files, as well as the fluctuations in the availability of the computer resources utilized during scanning and indexing, it is often difficult to configure indexing software in such a way as to ensure both a predetermined level of freshness and a predetermined level of inclusiveness/completeness.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided with one or more dynamic throughput threshold gate(s) that help control the assignment of electronic files to different indexing queues.

In one embodiment, electronic files are selectively assigned to a plurality of different indexing queues based on characteristics of the different indexing queues as well as the static file characteristics associated with each of the files. The files are then indexed in due course by one or more indexing engines. Upon detecting a change in a dynamic characteristic of the one or more indexed files, the throughput thresholds are then modified to obtain, maintain or modify a desired throughput for one of more of the indexing queues.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some aspects of the disclosed embodiments are operable to solve technical problems associated with computer indexing of electronic files.

Computer indexing of electronic files is somewhat unpredictable due, at least in part, to the variability between different electronic files. For instance, electronic files can vary in terms of type, formatting, size, accessibility, uniformity, storage location and/or availability. The availability of computer resources utilized for indexing can also vary due to fluctuations in network demands.

It is sometimes desirable to maintain a certain level of freshness and/or inclusiveness of indexed files. However, for at least the reasons mentioned above, this can be difficult.

Existing systems typically predetermine the parameters of the indexing software that is used to crawl and scan the electronic files during indexing. For instance, many indexing systems predetermine a scope of files to be scanned and pre-allocate a certain amount of the computing resources to the scanning and indexing of new documents and a certain amount of computing resources to scanning and re-indexing files that have already been indexed. When too many of a limited set of resources are allocated to scanning and indexing new files, the freshness of the index can be compromised. Alternatively, when too many of the limited resources are allocated to the scanning and re-indexing of indexed files, the inclusiveness of the index can be compromised. In at least this regard, existing indexing systems are too inflexible and limiting, making it very difficult to maintain a desired level of index freshness and/or inclusiveness.

These issues are even more apparent when the creation or modification of files within an indexing scope outpaces the growth of indexing capabilities or one or more files are encountered that are particularly unwieldy due to their size and/or complexity, and which are capable of bottlenecking the indexing queues. Periodic fluctuations in processor capabilities and resource availability can also further degrade the indexing processes.

In some situations, the technical effects of the disclosed embodiments can help to overcome some of the foregoing problems by significantly reducing an amount of user interaction required to tune an indexing system in response to dynamic conditions, as well as to help obtain or maintain desired levels of index freshness or inclusiveness.

The technical effects also include efficiency gains in computer processing, resulting from automatically and dynamically adjusting to fluctuations in the computer capabilities and resource availability occurring during indexing, as well as to the presence of particularly unwieldy files that are encountered during the indexing.

Various methods, systems and storage devices will now be described with reference to dynamic threshold gates which are operable to dynamically tune indexing parameters and to modify throughput thresholds for indexing queues.

The disclosed indexing processes include the evaluating and scanning of electronic files to determine the composition of the data contained within the files, as well as the characteristics of the files themselves. Each file is then selectively assigned to an appropriate indexing queue based on the characteristics of each file and the throughput thresholds associated with each of the different indexing queues.

The files are then indexed according to the processing capabilities and throughput thresholds associated with each of the corresponding indexing queues and indexing engines. Then, after indexing has commenced and upon detecting a change in a dynamic characteristic of one or more of the indexed files, the throughput thresholds are modified to obtain, maintain or modify a desired throughput for one of more of the indexing queues.

Attention will now be directed to FIGS. 1A-1D, which illustrate various embodiments of a computing environment 100 that may be used to implement aspects of the claimed invention. In each of these embodiments, one or more dynamic threshold gate is used to assign or otherwise control the assignment of different electronic files to appropriate indexing queues. These throughput threshold gates are referred to as dynamic because they dynamically modify their thresholds for assigning the electronic files to the different queues based on detected changes in dynamic characteristics of the files that are indexed.

The dynamic threshold gates are also referred to herein as "threshold gates," "throughput threshold gates," and "throughput thresholds." Various configurations of the dynamic threshold gates are shown in FIGS. 1A-1D as non-limiting examples. Other configurations can also be utilized, within the scope of the invention.

Figure 1A:
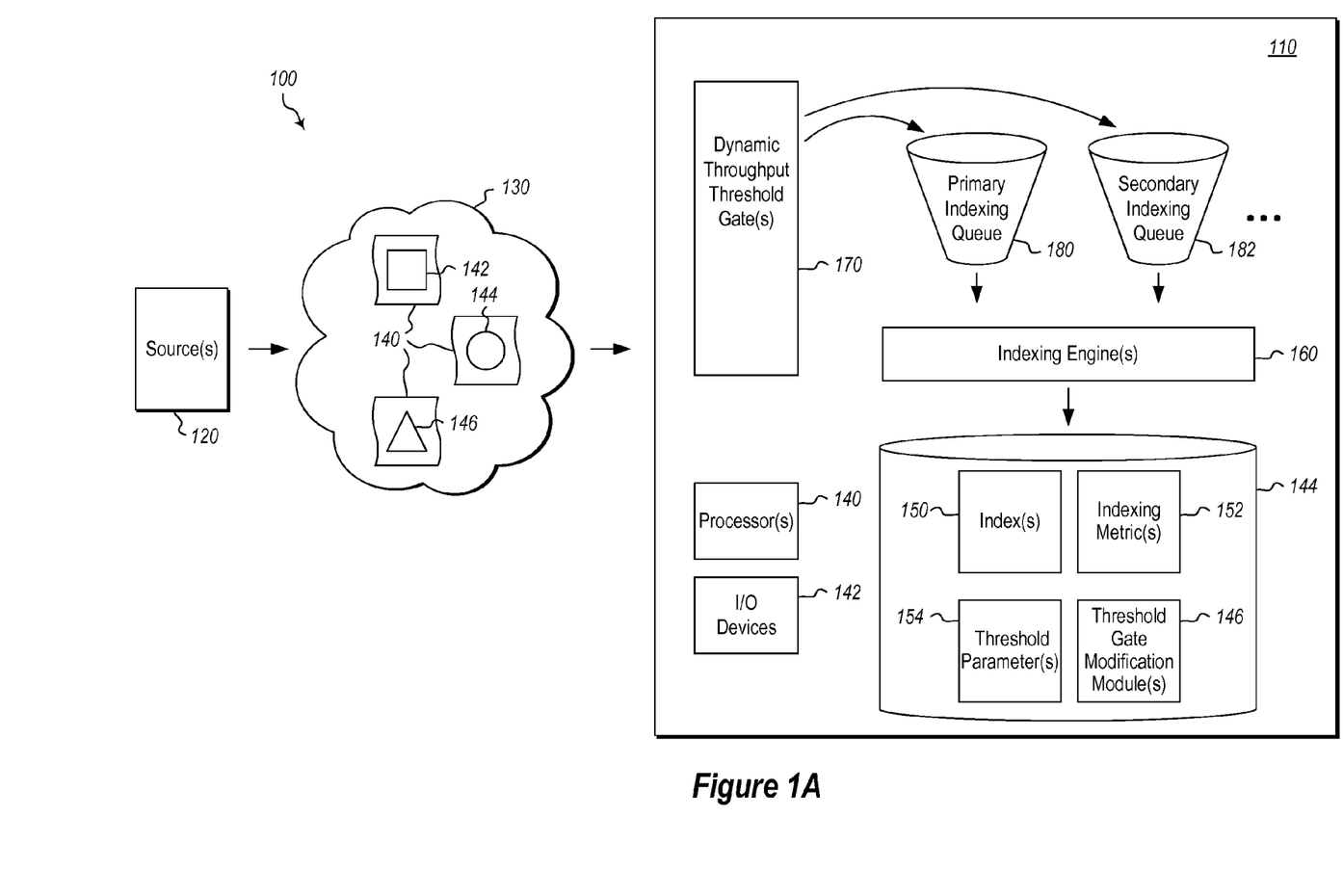
FIG. 1A illustrates an embodiment of a computing system which includes two different indexing queues and at least one throughput threshold gate that is operable for sorting files into the different indexing queues for processing the files to be indexed by at least one indexing engine.

As shown in FIG. 1A, a computing environment 100 for indexing electronic files can include a computing system 110 that is capable of accessing the electronic files from one or more source(s) 120. The source(s) 120 can be a single source, a plurality of distributed and remotely located sources, a plurality of individual networked local sources, and/or part of the illustrated computing system (110).

In some embodiments, source(s) 120 are applications or storage devices containing different files 140 that are provided to the computing system 110 through one or more network connection(s) 130.

Each of the files 140 is an electronic file stored in one or more different file formats. By way of example, the electronic files 140 can include word processing files, database files, multimedia files, graphic image files and/or any other type of electronic file that is stored in any type of file format.

The files 140 may comprise different characteristics, such as different sizes and compositions. For instance, some files may be only several kilobytes or megabytes, whereas others may be sized in the gigabytes or larger. Some files may also be composed of only a single type of content (e.g., only text and characters), whereas other files include a mixed composition of different data types or formats (e.g., presentations containing text, images and video content).

The files may also comprise different states of storage (e.g., volatile, non-volatile, disk, hard-drive, consolidated, distributed, local, remote, cloud etc.), as well as different states of accessibility (e.g., encryption, compression, network connectivity, etc.).

The network connection(s) 130 may include any combination of different network channels that are operable to transmit data, including shared and private network channels. The network connection(s) 130 can also include any combination of wired and wireless network connections.

The computing system 110 accesses or otherwise obtains the electronic files 140 from the one or more sources and performs various processes on the electronic files in order to index them. These index processes can include scanning the files, parsing the data in the files, referencing or mapping the content in the files to one or more indexes. In some instances, the indexing processes can also include decrypting, decompressing, assembling, pursuing linked data, or any other process required to obtain or analyze the data within the files.

As indicated above, the computing system 110 may take on various configurations in order to perform the requisite processing in a sufficient manner to provide the technical advantages referenced herein, and for at least dynamically modifying indexing parameters and throughput thresholds controlled by the threshold gates. Four specific configurations of the computing system 100 will now be described with in reference to FIGS. 1A-1D.

Figure 1B:
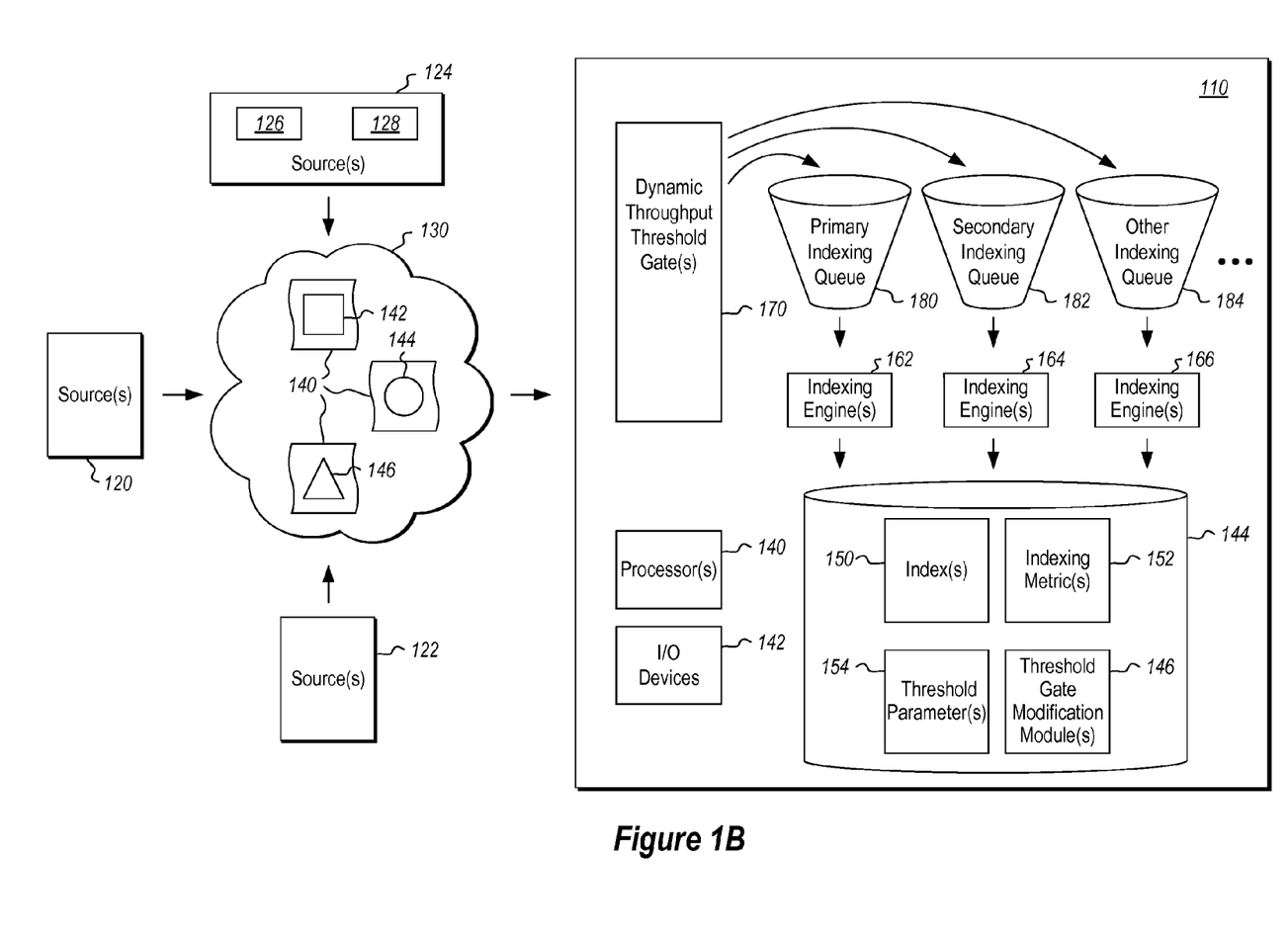
FIG. 1B illustrates an embodiment of a computing system which includes three different indexing queues and at least one throughput threshold gate that is operable for sorting files into the different indexing queues for processing the files to be indexed by different corresponding indexing engines.

In the embodiment of FIG. 1A, the electronic files 140 are illustrated as originating from a single node. However, this node is recited as source(s) 120 and can, therefore, include any combination of nodes. For instance, the file sources are illustrated as separate source(s) 120, 122 and 124 in FIG.

1B. Each of these sources can include intra-networked sources and/or inter-networked sources. The sources can also comprise different components of a single machine. For instance, source(s) 124 can include a single host computer having multiple virtual machines 126 and 128 running on the host.

FIG. 1A also illustrates the dynamic throughput threshold gate(s) (170), the indexing engine(s) 160, and the storage device(s) 144 as individual components. However, it will be appreciated that each of these components can comprise any combination of consolidated and distributed components, as described below in more detail. For instance, FIG. 1B illustrates the indexing engine(s) 160 of FIG. 1A as a plurality of discrete indexing engine(s) 162, 164 and 166 that are each dedicated to different corresponding indexing queues (i.e., primary indexing queue 180, secondary indexing queue 182 and another indexing queue 184). Ellipses are also provided to illustrate that the computing system 100 may comprise any number of indexing queues.

Although not required, the primary indexing queue(s) may process files more efficiently than the secondary indexing queue(s). This may occur, for example, by the computing system 110 applying more resources to the primary indexing queue(s) than to the secondary indexing queue(s). Likewise, indexing engine(s) assigned to the primary indexing queue(s) may operate more efficiently or have better capabilities than indexing engine(s) assigned to the secondary indexing queue(s).

Each of the different queues is assigned different throughput threshold requirements or indexing parameters that are used by the dynamic threshold gates to assign files to the different queues based on the files having matching file characteristics. The throughput threshold requirements or indexing parameters for each of the queues can be stored by the computing system in one or more storage device(s) 140.

Figure 1C:
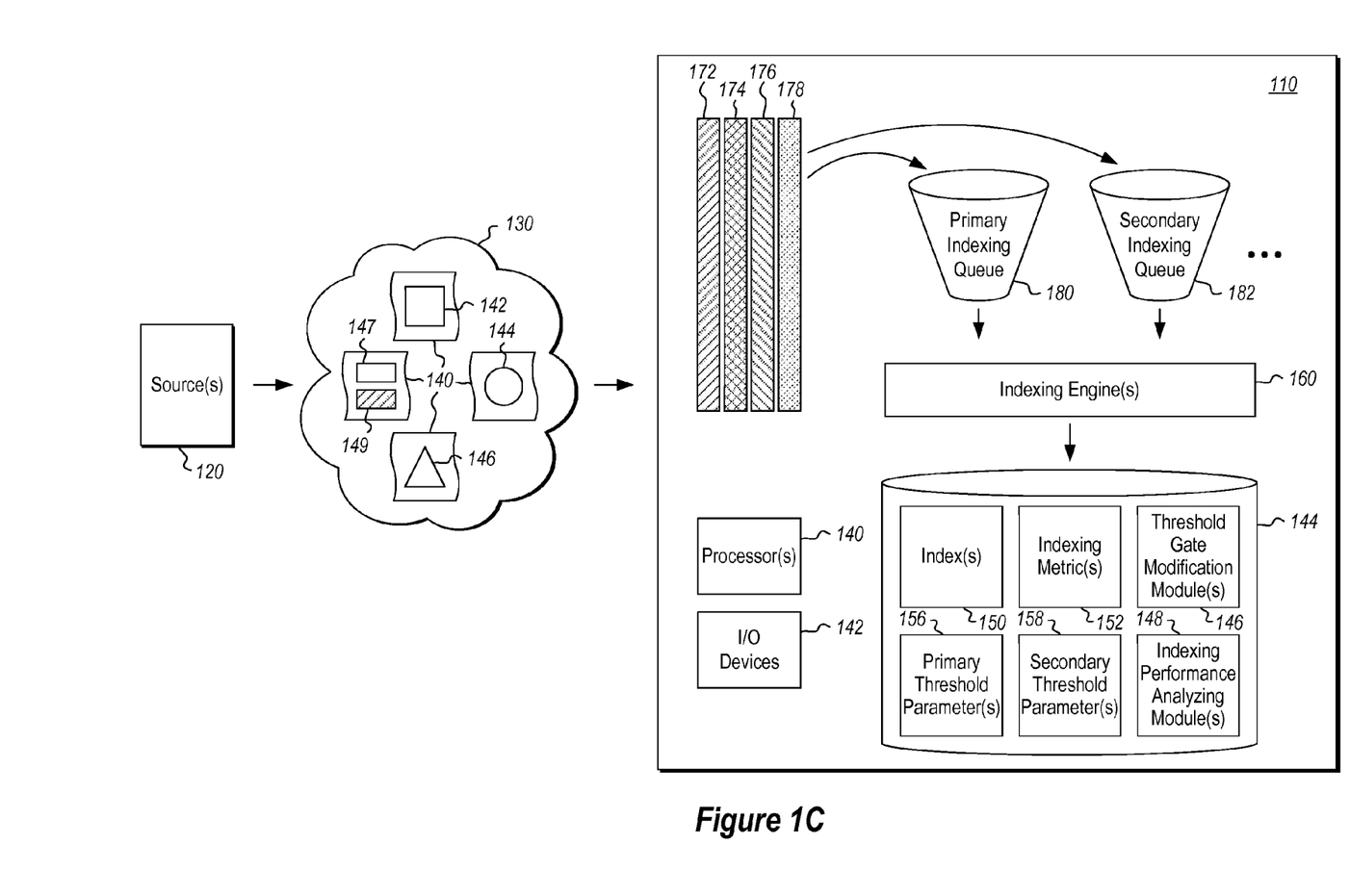
FIG. 1C illustrates an embodiment of a computing system which includes two different indexing queues and a plurality of throughput threshold gates that are operable for sorting files into the different indexing queues for processing the files to be indexed by at least one indexing engine.

Attention is now directed to the embodiment of FIG. 1C, which is similar to the embodiment of FIG. 1A, except that the throughput threshold gate(s) 170 of FIG. 1A is illustrated as a plurality of separate throughput threshold gates (172, 174, 176 and 178).

The storage device(s) 144 of FIG. 1C is also further modified with an indexing performance analyzing module 148 and the threshold parameters 154 are broken out into primary threshold parameters 156 and secondary threshold parameters 158 to illustrate that the components in the storage device(s) 144 can include any combination of consolidated and distributed configuration.

In FIG. 1C, the electronic files 140 are also supplemented with an additional file having mixed content, including indexable content 147 (i.e., content which is capable of being indexed by the indexing engine(s)) and non-indexable content 149 (i.e., content that the indexing engines cannot index, due to content type or format, rules, time constraints, incompatibility and/or any other reason). Different indexing parameters and thresholds controlled by the dynamic threshold gates can determine which content is indexable and which content is non-indexable, to accommodate different needs and preferences.

Figure 1D:
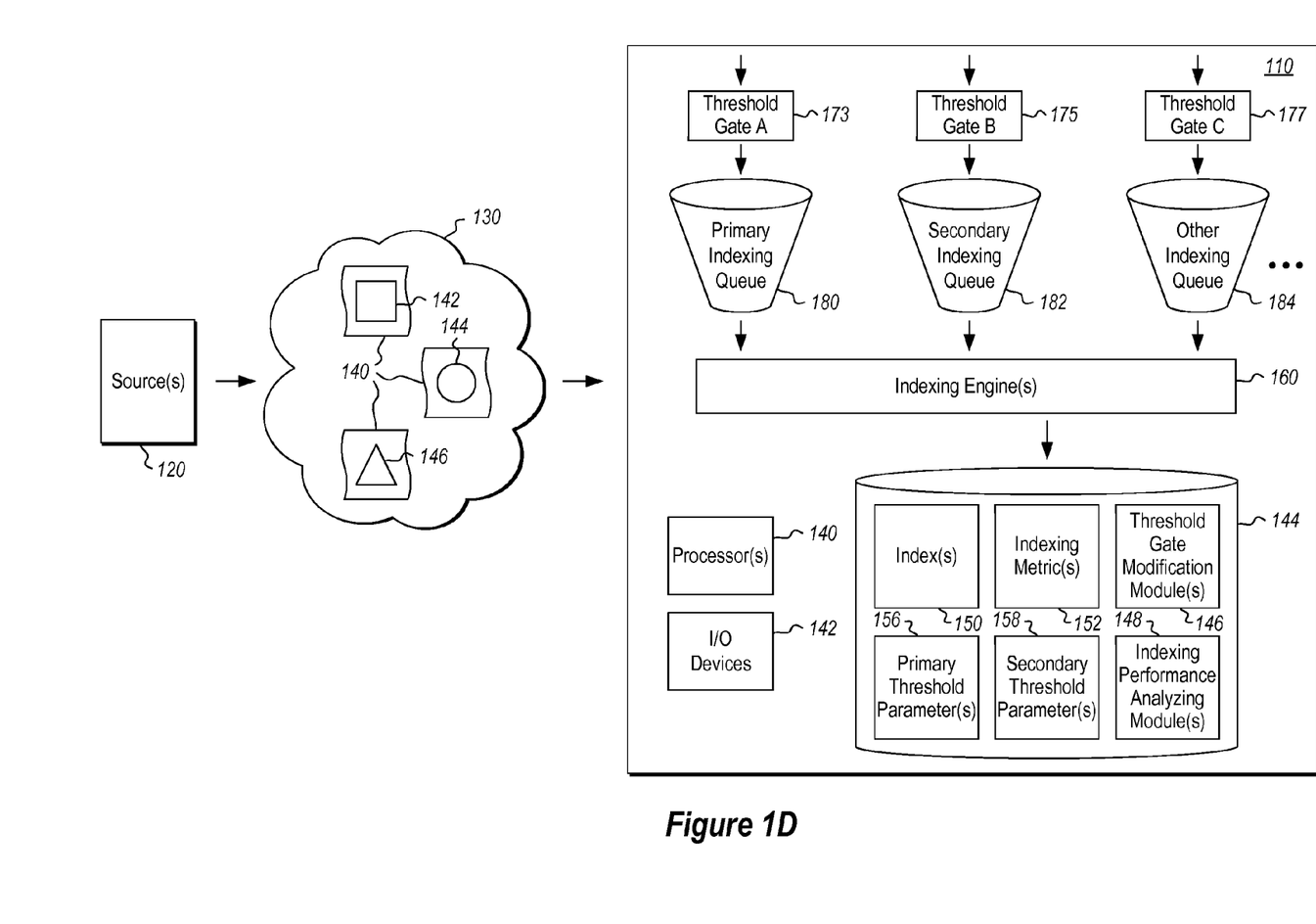
FIG. 1D illustrates an embodiment of a computing system which includes throughput threshold gates that are operable for sorting files into different corresponding indexing queues for processing the files to be indexed by at least one indexing engine.

The last embodiment, shown in FIG. 1D, is similar to the embodiment of FIG. 1B, except that the consolidated configuration of the dynamic throughput threshold gate(s) 170 of FIG. 1B are illustrated as individual threshold gate A (173), individual threshold gate B (175) and individual threshold gate C (177), each of which correspond separate indexing queues 180, 182 and 184, respectively.

The computing system 110, as described in each of the foregoing examples, may be embodied as one or more personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

Aspects of the invention may also be practiced in distributed system environments where local and remote computer systems, which are linked (either by hardwired data links, wireless data links, or by a combination of hardwired and wireless data links) through a network, both perform one or more tasks associated with the disclosed methods. As such, in a distributed system environment, the computer system 110 may also include a plurality of constituent computer systems, including but not limited to source(s) 120. In a distributed system environment, program modules may be located in both local and remote memory storage devices, including storage device(s) 144.

Those skilled in the art will also appreciate that the disclosed embodiments may be practiced in a cloud computing environment. Cloud computing environments may be distributed, although this is not required. When distributed, cloud computing environments may be distributed internationally within an organization and/or have components possessed across multiple organizations. As defined herein, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in this description and in the claims, the term "computing system" is defined broadly as including any device or system (or combination thereof) that includes at least one physical and tangible processor, and a physical and tangible memory capable of having thereon computer-executable instructions that may be executed by the processor.

Embodiments within the scope of the present invention also include physical and other computer-readable media for carrying or storing computer-executable instructions and/or data structures. The computer-executable instructions refers to any software objects, routines, or methods that may be executed by the one or more processors to cause computing system 110 to perform the claimed functionality that is described herein. In this regard, it will be noted that the different components, modules, engines, and services described herein may be implemented as objects or processes that execute on the computing system 110 (e.g., as separate threads). The computer-executable instructions may be, for example, binaries, intermediate format instructions such as assembly language, or even source code. These computer-executable instructions or modules include the threshold gate modification module(s) 146 and indexing performance analyzing module(s) 148.

The computer-readable media storing the computer-executable instructions can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

The storage device(s) 144 of the computing system 110, in addition to storing the aforementioned computer-executable instructions, also store one or more indexes 150, indexing metric(s) 152 and the threshold parameter(s) 154, including the primary threshold parameters(s) 156 and the secondary threshold parameter(s) 158. The storage device(s) 144 also store computer-executable instructions for instantiating the throughput threshold gates, indexing engines and indexing queues.

Various methods for implementing the disclosed embodiments will now be described with specific reference to FIGS. 2 and 3. When the referenced acts of the disclosed methods are implemented in software, the one or more processors 140 of the computing system 110 perform the acts and direct the operation of the computing system 110 in response to having executed the stored computer-executable instructions defined by the software.

Figure 2:
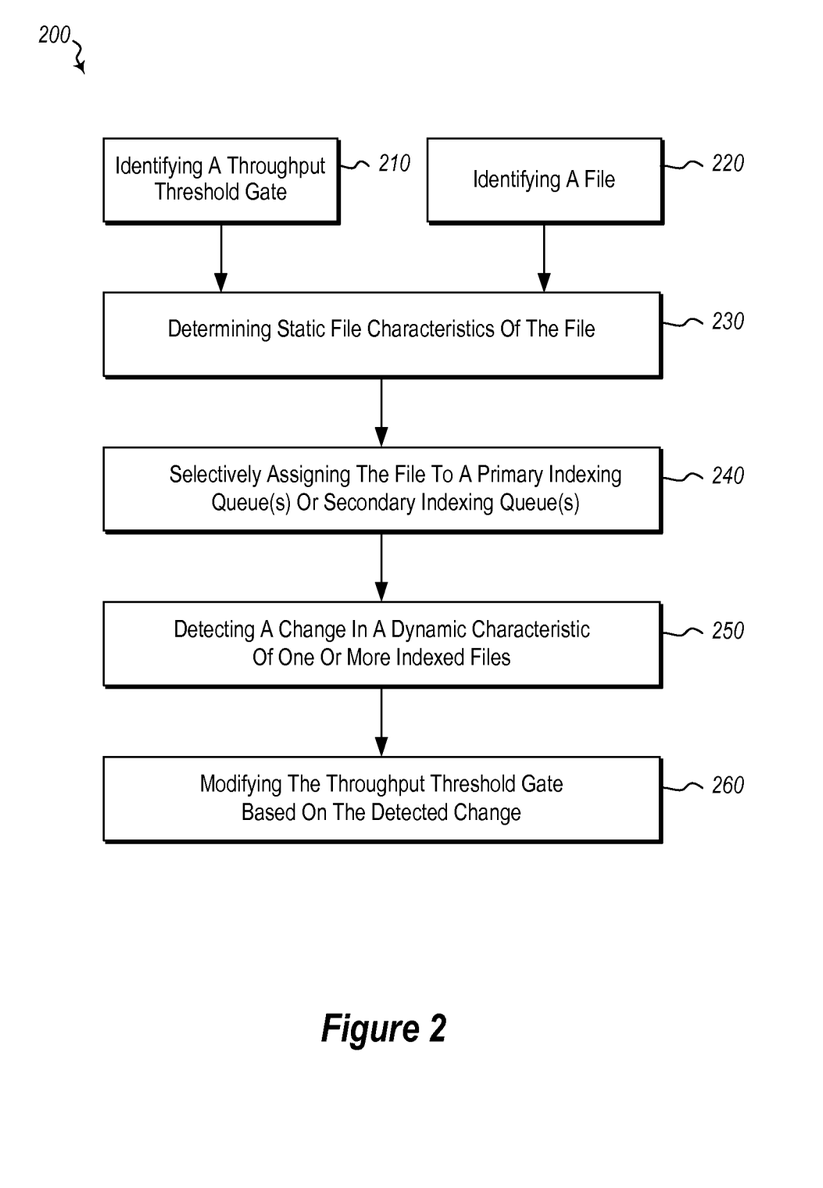
FIG. 2 illustrates a flowchart of at least one method for dynamically modifying throughput thresholds that are used to assign various files to different indexing queues for subsequent indexing.

FIG. 2 illustrates a flowchart 200 of one embodiment for using dynamic threshold gates for dynamically modifying the indexing parameters and throughput thresholds of indexing queues.

As shown, the illustrated method includes the act of identifying a throughput threshold gate (act 210) and the act identifying a file (act 220). This file can include any type of electronic file that is stored in any type of format, in one or more different storage locations. The file can be a single consolidated file or a distributed file that is stored in different locations and/or in different formats.

The files 140 illustrated in FIGS. 1A-1D are shown with different shapes (i.e., a square 142, a circle 144, a triangle 146 and rectangles 147, 148). These shapes illustrate how the different files 140 can be configured with different characteristics. The differences may include differences in file type, formatting, encryption, storage location, size, uniformity, source, and/or any other differences that are detectable by the computing system 110 prior to indexing the files. These characteristics are referred to as static file characteristics.

The computing system 110 can identify the static characteristics of each file (act 230) by examining metadata associated with the file. The file may contain the metadata or the metadata may be referenced by another resource or index. The computing system may also perform acts of decryption, authentication, decompression, compiling, parsing, translating and/or pursuing links to examine the data of the file, and to further identify the characteristics of the file. This can also include determining whether the file includes a single type of content or a plurality of different types of content. Depending on the indexing parameters and capabilities defined by the computing system 110, the file may contain one portion of content that is deemed indexable and/or a portion of content that is deemed non-indexable.

In some embodiments, the identification of the file characteristics also includes modifying the file so that it has different characteristics. This modification can include modifying the metadata and/or modifying the actual content of the file.

Once the static characteristics of the file are determined (act 230), the file is selectively assigned to one or more primary indexing queue(s) or secondary indexing queue(s) (act 240) having matching threshold parameters or requirements. Accordingly, this process may also include determining the throughput thresholds or other indexing parameters associated with each of the different queues.

The dynamic threshold gate is capable of referencing the indexing parameters or other throughput threshold requirements corresponding to each of the indexing queues from the storage device 144.

The threshold parameters can include any combination of primary threshold parameters (e.g., file type, file size, percent of file considered indexable, percent of file considered non-indexable, file source, file composition, or any other file characteristic) as well as and secondary threshold parameters (e.g., computer capabilities, time and/or resources required to index a file, or any other parameters that are not considered file characteristics).

After being assigned to the appropriate queues (act 240), the files are indexed by one or more corresponding indexing engine(s). As indicated above, the indexing queues can include any combination of one or more primary indexing queues and secondary indexing queues. The indexing engines can also be configured as dedicated or consolidated indexing engines to index the files in parallel or series, as desired. Likewise, the dynamic throughput threshold gate(s) can also be configured as consolidated or separated components to process and examine the files in series or in parallel.

The throughput gates can also be configured with different sets of capabilities or throughput threshold requirements. For instance, this is illustrated by the different shading applied to gates 172, 174, 176 and 178, wherein each of the gates is configured to identify different characteristics for assigning files to the primary and secondary indexing queues.

By way of example, gate 172 may identify all files of a particularly large size to the secondary queue 182 and all files of a particularly small size range to the primary queue 180. Gate 174 may assign all files of a first type to the primary queue 180 and all files of a second type to the secondary queue 182 or anther queue. The other gates, 176 and 178, may also assign different files to different queues based on different file characteristics and queue threshold requirements.

In another example, each of the different gates (172, 174, 176 and 178) is assigned or dedicated to different sources of the files, such that files from a first source are examined by gate 172 and files from a second source are examined by gate 174, or another gate.

In yet another example, files are initially accessed and examined by any of the gates 172, 174, and 176. Then, when a particularly unwieldy file is detected, it is assigned to a specialized gate 178 that performs additional processing to further examine the file and to make an appropriate queue assignment. The additional processing can include pursuing a link, assembling distributed content, translating, decrypting, decompressing, parsing, or any other process that is not performed by the other gates.

Irrespective of how a file is assigned to a particular queue, it is ultimately indexed. However, after indexing has commenced, dynamic conditions can affect the continued indexing of other files. For instance, increased network demands can temporarily reduce processing capabilities. Likewise, an increase in a particular type of document can stretch resources beyond intended limits.

The present embodiments address these dynamic circumstances by first detecting the change of one or more dynamic characteristics of the files being indexed (act 250) and then automatically modifying the throughput threshold gate (act 260) to specify or apply different throughput thresholds or indexing parameters for assigning files to the indexing queues (act 260).

The detection of the change in the dynamic characteristics (act 250) may be accomplished, for example, by the indexing performance analyzing module(s) 148 examining and/or tracking one or more indexing metric(s) 152 over time to detect a change in one or more of the metrics, based on an average or absolute value.

The modifying of the throughput threshold gates may, likewise, be accomplished by the threshold gate modification module 146 modifying the throughput thresholds or indexing parameters used by the threshold gates to assign the files to the indexing queues. In some instances, this includes modifying the indexing parameters and or throughput thresholds associated with one or more of the different queues.

The indexing metrics used to determine a change has occurred in the dynamic indexing characteristics can include metrics that identify the time to index a file, the size of a file, type of a file or any other metric associated with the characteristics of indexed files. The indexing metric(s) can also include averages, ranges, statistical distributions and other statistical data that is used by the threshold gate modification module(s) 146 to determine that a change has occurred in the dynamic characteristic (act 250).

In one embodiment, the dynamic change includes a detected decrease in a time to index one or more files that causes an average or absolute value of the time to index to rise above a predetermined threshold. The system can then respond by automatically modifying the throughput threshold gate (act 260) by changing the throughput threshold requirements by decreasing indexing parameters associated with the primary indexing queue so that fewer files are assigned to the primary indexing queue.

In another embodiment, the dynamic change includes a detected decrease in file or index freshness for at least a predetermined period of time and wherein modifying the throughput threshold gate comprises changing the throughput threshold requirements by increasing indexing restrictions or parameters associated with the primary indexing queue so that fewer files of a particular type (e.g., large or unwieldy files) are assigned to the primary indexing queue. This will enable more files to be indexed quickly by the primary indexing queue.

In another embodiment, the dynamic change includes a detected increase in file or index freshness and wherein modifying the throughput threshold gate comprises changing the throughput threshold requirements by decreasing indexing restrictions or parameters associated with the primary indexing queue so that more files are assigned to the primary indexing queue. This can decrease freshness but increase index inclusiveness by enabling more types of files to be scanned, even if they take longer to scan.

In another embodiment, the detected change is a detected decrease in a particular file type being indexed and wherein modifying the throughput threshold gate comprises changing throughput threshold requirements for the primary indexing queue so that more files of the particular file type are assigned to the primary indexing queue.

In another embodiment, the detected change is a detected decrease in quantity of files being indexed for a particular node in a distributed system and wherein modifying the throughput threshold gate comprises changing throughput threshold requirements for the primary indexing queue so that more files of the particular node are assigned to the primary indexing queue.

In another embodiment, the detected change is a detected decrease in files of a particular size being indexed and wherein modifying the throughput threshold gate comprises changing throughput threshold requirements for the primary indexing queue so that more files of the particular size are assigned to the primary indexing queue.

In another embodiment, the detected change is a detected decrease in working set accuracy corresponding to one or more search results against a working set of documents and wherein modifying the throughput threshold gate comprises changing throughput threshold requirements for the primary indexing queue so that more files of a particular working set are assigned to the primary indexing queue.

In another embodiment, the detected change is a detected decrease in processing capabilities of the computing system and wherein modifying the throughput threshold gate comprises changing throughput threshold requirements for the primary indexing queue so that fewer files are assigned to the primary indexing queue.

In another embodiment, the detected change is a detected decrease in a percentage of newly created files being indexed relative to files that are older than the newly created files being indexed and wherein modifying the throughput threshold comprises changing throughput threshold requirements for the primary indexing queue so that fewer of the older files are assigned to the primary indexing queue.

As noted above, the modifying of the throughput thresholds gate may only occur, in some instance, after first detecting that the change in the dynamic characteristic persists for a predetermined period of time. The predetermined period of time can be set by an administrator or may be automatically set or adjusted based on historical precedent. For instance, the predetermined period of time may be based on a season, time of day, client/source, software release, and so forth.

By way of example, if historical precedent indicates that there is a substantial increase in modified files of a particular type to be scanned whenever a new software is released by a client, which typically lasts for about 10 hours, then the predetermined period of time may be manually or automatically set to 10 hours whenever another new release is provided by that client, such that the system only modifies the gates if this threshold is exceeded for a detected change in the particular type of files being indexed from that client.

In another example, historical precedent may indicate that there is a reduction in availability of computing resources for a few hours every day (e.g., during peak networking hours), during which the index freshness is also reduced due to a corresponding degradation in index processing. In this example, the predetermined period of time may be set to at least eclipse the historical duration of the peak networking hours.

In some embodiments, prior to modifying the throughput threshold gates, the disclosed methods also include notifying a user of the detected change and waiting until the user provides user input that is operable to cause the modifying of the throughput threshold gate. The notification may be accomplished, for example, with administrator interface notification, email or text notification, or any other suitable notification. The user input for modifying the threshold gates can also be entered at one or more interfaces.

Figure 3:
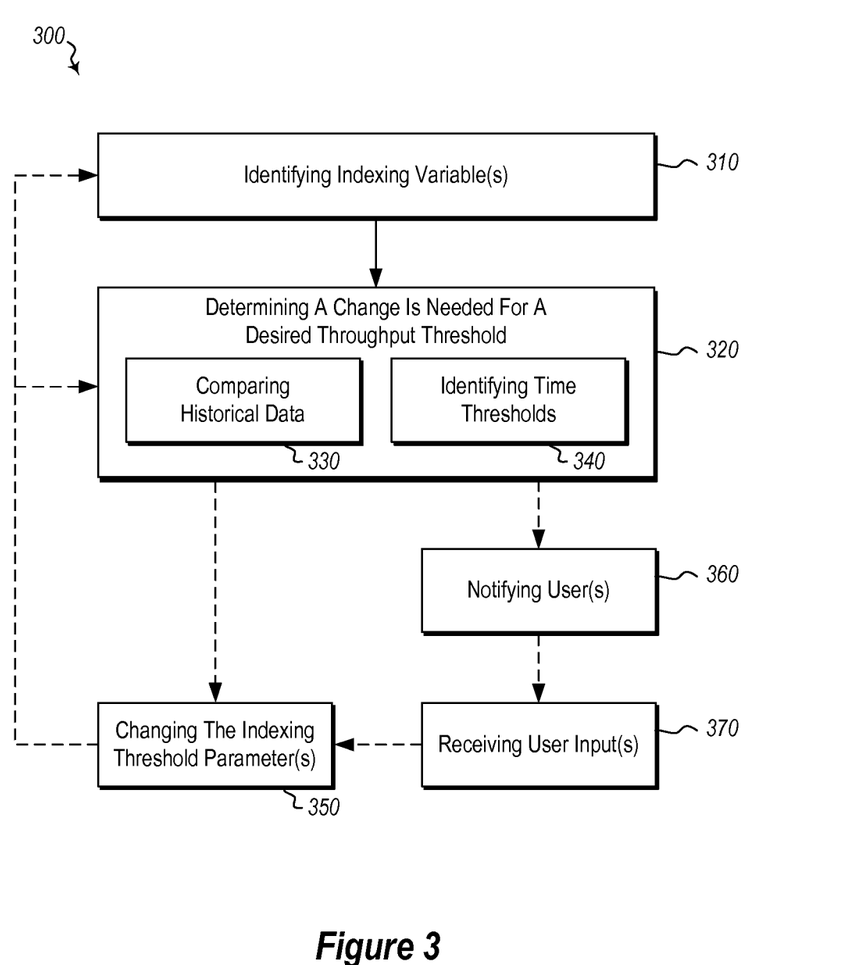
FIG. 3 illustrates another flowchart of at least one method for dynamically tuning indexing parameters and/or for modifying throughput thresholds that are used to assign various files to different indexing queues for subsequent indexing.

In another embodiment, illustrated in FIG. 3, a flowchart 300 illustrates how the computing system first identifies indexing variables (act 310) and then determines that a change is needed for a throughput threshold (act 320). It will be appreciated that the indexing variables can include any combination of the foregoing file characteristics and throughput thresholds and indexing parameters, as well as the dynamic characteristics of indexed files.

The system may determine a change is needed (act 320), as suggested above, by comparing the indexing variables to historical data (act 330) and/or predetermined time thresholds (act 340). When a change is needed, it can simply be made by the dynamic threshold gate(s) (act 350), before or after notifying the user(s) (act 360) and receiving user input(s) (act 370).

The foregoing embodiments can be used to automatically tune indexing systems in response to dynamic conditions, as well as to help obtain or maintain desired levels of index freshness or inclusiveness. These embodiments can also be used to dynamically adjust to fluctuations in computer capabilities and resource availability occurring during indexing, as well as to the presence of particularly unwieldy files that are encountered during indexing.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. A computing system comprising:
at least one processor;
at least one storage medium having stored computer-executable instructions which, when executed by the at least one processor, implement a method of dynamically modifying throughput thresholds for indexing queues, the method comprising acts of:
at a throughput threshold gate specifying throughput threshold requirements for assigning new files to different indexing queues based on characteristics of the new files, wherein different indexing queues comprise a primary indexing queue and a secondary indexing queue;
determining characteristics for a file;
the throughput threshold gate comparing the determined characteristics of the file to the throughput threshold requirements and assigning the file to either the primary indexing queue or the secondary indexing queue based on matching the determined file characteristics to the throughput threshold requirements of one or the other of the primary or secondary queue;
indexing the file in accordance with the throughput threshold requirements for the indexing queue to which the file is assigned by the throughput threshold gate;
for files which have been indexed, at a performance analyzing module tracking one or more indexing metrics over a given time period for one or more indexed files and detecting a change in a characteristic of at least one of the indexed files; and
based on the detected change in the characteristic of the at least one indexed file, modifying the throughput threshold requirements at the throughput threshold gate for at least one of the primary or secondary queues.

2. The computing system of claim 1, wherein the determined characteristics of the file comprise at least a file size and a file type.

3. The computing system of claim 2, wherein the determined characteristics of the file further comprise a mixed content characteristic in which the file contains two different types of content, the two different types of content comprising index eligible content and index ineligible content.

4. The computing system of claim 3, wherein determining the characteristics of the file comprises determining how much index eligible content is contained within the file.

5. The computing system of claim 1, wherein the detected change is a characteristic of the at least one indexed file comprises a detected decrease in a time to index the at least one file that causes an average or absolute value of the time to index the one or more indexed files being tracked to rise above a predetermined threshold and wherein modifying the throughput threshold requirements at the throughput threshold gate comprises changing the throughput threshold requirements by decreasing indexing parameters associated with the primary indexing queue so that fewer files are assigned to the primary indexing queue.

6. The computing system of claim 1, wherein the detected change in a characteristic of the at least one indexed file comprises a detected decrease in file freshness and wherein modifying the throughput threshold requirements at the throughput threshold gate comprises changing the throughput threshold requirements by increasing indexing parameters associated with the primary indexing queue so that fewer files are assigned to the primary indexing queue.

7. The computing system of claim 6, wherein the detected decrease in file freshness is a decrease that causes the file freshness to fall below a predetermined threshold for at least a predetermined period of time.

8. The computing system of claim 1, wherein the detected change in a characteristic of the at least one indexed file comprises a detected increase in file freshness and wherein modifying the throughput threshold requirements at the throughput threshold gate comprises changing the throughput threshold requirements by decreasing indexing parameters associated with the primary indexing queue so that fewer files are assigned to the primary indexing queue.

9. The computing system of claim 1, wherein the detected change in a characteristic of the at least one indexed file comprises a detected decrease in a particular file type being indexed and wherein modifying the throughput threshold requirements at the throughput threshold gate comprises changing throughput threshold requirements for the primary indexing queue so that more files of the particular file type are assigned to the primary indexing queue.

10. The computing system of claim 1, wherein the detected change in a characteristic of the at least one indexed file comprises a detected decrease in quantity of files being indexed for a particular node in a distributed system and wherein modifying the throughput threshold requirements at the throughput threshold gate comprises changing throughput threshold requirements for the primary indexing queue so that more files of the particular node are assigned to the primary indexing queue.

11. The computing system of claim 1, wherein the detected change in a characteristic of the at least one indexed file comprises a detected decrease in files of a particular size being indexed and wherein modifying the throughput threshold requirements at the throughput threshold gate comprises changing throughput threshold requirements for the primary indexing queue so that more files of the particular size are assigned to the primary indexing queue.

12. The computing system of claim 1, wherein the detected change in a characteristic of the at least one indexed file comprises a detected decrease in accuracy corresponding to one or more search results against a particular working set of documents searched in one or more indexed files and wherein modifying the throughput threshold gate comprises changing throughput threshold requirements for the primary indexing queue so that fewer files having the particular working set of documents are assigned to the primary indexing queue.

13. The computing system of claim 1, wherein a decrease in processing capabilities of the computing system is detected and wherein modifying the throughput threshold requirements at the throughput threshold gate comprises changing throughput threshold requirements for the primary indexing queue so that fewer files are assigned to the primary indexing queue.

14. The computing system of claim 1, comprising a plurality of secondary queues each having different throughput threshold requirements corresponding to the determined characteristics of one or more files.

15. The computing system of claim 1, wherein the method further comprises, prior to modifying the throughput threshold requirements at the throughput threshold gate, comparing the detected change to one or more historical precedents associated with the detected change to determine that the detected change exceeds the one or more historical precedents.

16. The computing system of claim 1, wherein the method further comprises, prior to modifying the throughput threshold requirements at the throughput threshold gate, notifying a user of the detected change and waiting until the user provides user input that is operable to cause the modifying of the throughput threshold requirements at the throughput threshold gate.

17. The computing system of claim 1, wherein the detected change in a characteristic of the at least one indexed file comprises a detected decrease in a percentage of newly created files being indexed relative to files that are older than the newly created files being indexed and wherein modifying the throughput threshold requirements at the throughput threshold gate comprises changing throughput threshold requirements for the primary indexing queue so that fewer of the older files are assigned to the primary indexing queue.

18. One or more hardware storage device having stored computer-executable instructions which, when executed by at least one processor of a computer system, implement a method for dynamically modifying throughput thresholds for indexing queues, the method comprising acts of:
at a throughput threshold gate specifying throughput threshold requirements for assigning new files to different indexing queues based on static file characteristics of the new files, wherein different indexing queues comprise a primary indexing queue and a secondary indexing queue;
determining characteristics for a file;
the throughput threshold gate comparing the determined characteristics of the file to the throughput threshold requirements and assigning the file to either the primary indexing queue or the secondary indexing queue based on matching the determined characteristics of the file to the throughput threshold requirements of one or the other of the primary or secondary queue;
indexing the file in accordance with the throughput threshold requirements for the indexing queue to which the file is assigned by the throughput threshold gate;
for files which have been indexed, at a performance analyzing module tracking one or more indexing metrics over a given time period for one or more indexed files and detecting a change in a characteristic of at least one of the indexed file; and
based on the detected change in the characteristic of the at least one indexed file, modifying the throughput threshold requirements at the throughput threshold gate for at least one of the primary or secondary queues.

19. A computer implemented method for dynamically modifying throughput thresholds for indexing queues, the method comprising acts of:
at a throughput threshold gate specifying throughput threshold requirements for assigning new files to different indexing queues based on characteristics of the new files, wherein different indexing queues comprise a primary indexing queue and a secondary indexing queue;
determining characteristics for a file;
the throughput threshold gate comparing the determined characteristics of the file to the throughput threshold requirements and assigning the file to either the primary indexing queue or the secondary indexing queue based on matching the determined characteristics to the throughput threshold requirements of one or the other of the primary or secondary queue;
indexing the file in accordance with the throughput threshold requirements for the indexing queue to which the file is assigned by the throughput threshold gate;
for files which have been indexed, at a performance analyzing module tracking one or more indexing metrics over a given time period for one or more indexed files and detecting a change in a characteristic of at least one of the indexed files; and
based on the detected change in the characteristic of the at least one indexed file, modifying the throughput threshold requirements at the throughput threshold gate for at least one of the primary or secondary queues.

* * * * *